United States Patent [19]

Nacewicz et al.

[11] Patent Number: 5,212,436
[45] Date of Patent: May 18, 1993

[54] SINGLE PHASE MOTOR START SYSTEM

[75] Inventors: Stanley J. Nacewicz, Plainville; William R. Manning, Wrentham, both of Mass.

[73] Assignee: Texas Instruments Incorporated, Dallas, Tex.

[21] Appl. No.: 805,718

[22] Filed: Dec. 6, 1991

[51] Int. Cl.$^5$ .................................................. H02P 1/44
[52] U.S. Cl. ............................ 318/788; 318/778; 318/781; 318/787
[58] Field of Search .............. 318/778, 779, 781, 782, 318/783, 784, 785, 786, 787, 788, 789, 790, 791, 792, 795

[56] References Cited

U.S. PATENT DOCUMENTS

| | | | |
|---|---|---|---|
| 3,673,480 | 6/1972 | Johnstone . | |
| 3,916,274 | 10/1975 | Lewus . | |
| 3,965,392 | 6/1976 | Moorehead et al. . | |
| 4,387,330 | 6/1983 | Zigler | 318/788 |
| 4,463,304 | 7/1984 | Miller | 318/790 |
| 4,467,257 | 8/1984 | Douthart et al. | 318/774 |
| 4,574,229 | 3/1986 | Kim | 318/788 |
| 4,734,601 | 3/1988 | Lewus | 318/793 X |
| 4,794,288 | 12/1988 | Lewus | 318/794 X |
| 4,820,964 | 4/1989 | Kadah et al. | 318/786 |

Primary Examiner—Bentsu Ro
Attorney, Agent, or Firm—Russell E. Baumann; René E. Grossman; Richard L. Donaldson

[57] ABSTRACT

An autotransformer is used to replace the start capacitor in a split phase induction motor. The autotransformer windings are protected by a PTC resistor which also serves to effectively de-energize the auxiliary winding. In a preferred embodiment, efficiency of the motor in the run mode is enhanced by shunting the secondary of the autotransformer with an NTC element. In alternative embodiments a relay coil is placed in series with the auxiliary winding circuit to remove the PTC and the primary of the autotransformer from the circuit when the motor is in the run mode.

12 Claims, 2 Drawing Sheets

SINGLE PHASE MOTOR START SYSTEM

This invention relates generally to electric motor starting systems and more particularly to such systems for single, split phase motors.

In such motors current in the main and auxiliary windings are caused to be out of phase with each other, ideally in the order of 90 electrical degrees. Optimum starting torque and running conditions are obtained when one capacitor is used for starting and a smaller capacitor is used for running. However, the use of two capacitors adds considerably to the cost of the motor.

An effective compromise of cost and efficiency has been to use a single capacitor coupled to a PTC element. The PTC element changes from a low resistant state to a high resistance state shortly after energization to effectively take the capacitor out of the circuit during the run mode of the motor. However, new efficiency requirements have been mandated by government agencies making a two capacitor type of network for obtaining both desired starting and running characteristics a practical necessity.

It is an object of the present invention to provide a split phase motor starting system which provides starting and running characteristics of a conventional capacitor start, capacitor run motor but at a lower cost. It is another object to provide a split phase motor start system which is reliable, long lived and inexpensive. Other objects will be in part apparent and in part pointed out hereinafter.

Briefly, in accordance with the invention, a step-up autotransformer is used in place of a conventional start capacitor. A PTC resistor is placed in series with the autotransformer to both protect the windings of the autotransformer and to effectively take the primary winding out of the circuit once the motor is energized. Preferably, in order to enhance the efficient running performance of the motor, an NTC element is coupled across the secondary winding of the autotransformer to effectively short out the secondary winding as the motor goes into the run mode.

In alternate embodiments of the invention an electromagnetic coil is placed in series with the run capacitor and is arranged in one embodiment to open normally closed relay contacts connected to the PTC element and close normally open contacts shunting the autotransformer's secondary. In another embodiment normally closed contacts are connected to the primary winding and normally open contacts are connected to a tap in the secondary winding. This latter embodiment car also be modified by placing normally closed relay contacts between the PTC resistor and the primary winding of the autotransformer.

The invention accordingly comprises the constructions hereinafter described, the scope of the invention being indicated in the appended claims.

BRIEF DESCRIPTION OF THE DRAWINGS

In the accompanying drawings, in which several of various possible embodiments are illustrated.

Corresponding reference characters indicate corresponding parts throughout the drawings.

DESCRIPTION OF PREFERRED EMBODIMENTS

Figure 1:
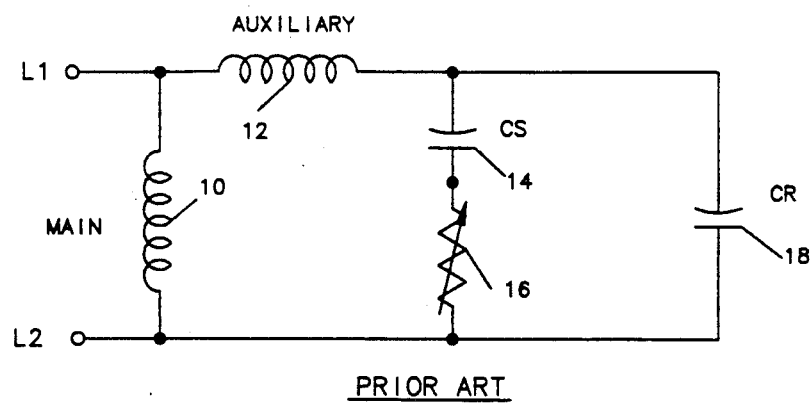
FIG. 1 is a schematic circuit of a prior art capacitor start, capacitor run split phase motor.
Figure 2:
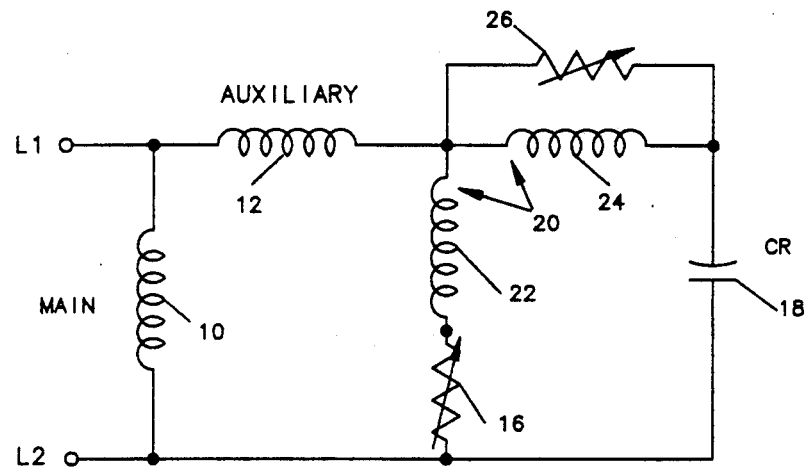
FIG. 2 is a schematic circuit of a preferred embodiment of the invention.

With reference to FIG. 1 a conventional split phase, capacitor start, capacitor run (CSCR) motor is shown comprising a main winding 10 connected between supply lines L1, L2 and an auxiliary winding 12 connected in parallel with winding 10. A start capacitor 14 is serially connected to PTC resistor 16 between auxiliary winding 12 and line L2 with a run capacitor 18 coupled across capacitor 14 and PTC resistor 16. Upon energization start capacitor 14 in conjunction with auxiliary winding 12 provide desired starting torque to initiate rotation of the rotor. The start capacitor 14 is then effectively de-energized once the PTC resistor 16 heats up beyond its anomaly temperature and goes into a high resistance state leaving only run capacitor 18 in the circuit for efficient, quiet performance in the run mode. Generally, large short duty capacitors are required to provide the desired high locked rotor starting torque, typically ten to twenty times as much capacitance compared to the capacitor which is in continuous operation during the run mode. Circuits of this type are generally used with, inter alia, air conditioning and refrigeration compressor motors.

Although the use of autotransformers for starting motors was proposed in the past, inherent limitations in the system limited its usefulness and it failed to achieve widespread acceptance. The efficiency of such systems was poor, and power consumption was high. The coils were large and typically would be switched out of the circuit once the motor entered the run mode; however, due to arcing problems during switching procedure the coils were unreliable and short lived. However, in accordance with the present invention the use of a PTC resistor in series with the autotransformer to protect the coils and the use of an NTC element to maintain or improve the efficiency of the motor during its run mode has resulted in a new and improved, as well as a lower cost, split phase motor start system. The system advantageously allows the use of a smaller motor, as measured by the run requirements, in view of the increase torque available for starting compared to conventional systems.

In accordance with the invention a step-up autotransformer 20 comprising a primary winding 22 and a secondary winding 24 is used in place of the start capacitor. PTC resistor 16 is serially connected to one side of primary winding 22 with the other side of winding 22 connected to the auxiliary winding 12 as well as to the secondary winding 24 which in turn is connected to run capacitor 18. Preferably, in order to improve the efficiency of the performance of the motor during the run mode an NTC element 26 is connected in parallel with the secondary winding 24. That is, at the same time, or a few milliseconds after the PTC element goes into the high resistance state the NTC element heats up and goes from a high resistance state of 200 ohms for example to a very low resistance state to effectively short out the secondary winding 24 to obtain high motor efficiency.

A capacitor of value C, connected to the secondary of a step-up autotransformer appears to the primary of the transformer as having an ideal value of $A^2C$ where A is the ratio of the transformer windings. For example, a 15 microfarad capacitor connected to the high voltage secondary of a transformer with a ratio of 3 to 1 would appear, ideally, to the primary as a 9×15=135 microfarad capacitor. Typically, in the air conditioning and refrigeration market for example, a start capacitor is in the one to two hundred microfarad range. Thus the autotransformer increases the effective value of the capacitor with respect to the auxiliary winding.

Initially upon energization the reactance of run capacitor 18 is reflected into the primary winding 22, in effect, simulating a capacitor start system. That is, a conventional run capacitor is in the order of 15 microfarads while the start capacitor is typically in the order of 135 microfarads. By means of the autotransformer 20 the load on the secondary of 1–5 microfarads is approximately 177 ohms which is reflected to the primary. A suitable turns ratio for the autotransformer is one turn of the primary to three turns of the secondary resulting in the effective reactance in the primary of 19.6 ohms i.e., 177 ohms divided by 9, which is the capacitive reactance of a typical 135 microfarad start capacitor.

Figure 3:
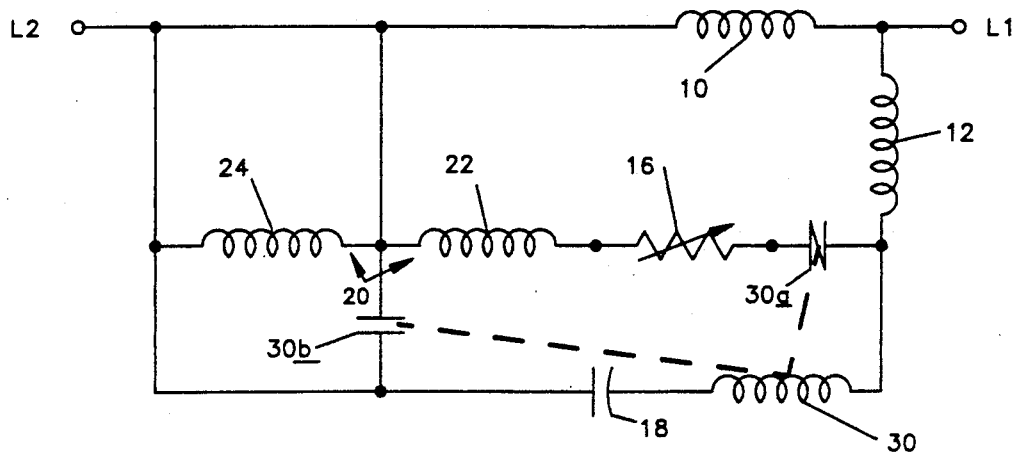
FIGS. 3-5 are schematic circuits of alternate embodiments of the invention.

A relay, either current or voltage responsive, can be used to take selected components out of the circuit once they have completed their function during starting. For example, as seen in FIG. 3, coil 30 is placed in series with run capacitor 18 and controls the operation of normally closed contacts 30a connected in series with PTC resistor 16 and normally open contacts 30b coupled across secondary winding 24 of autotransformer 20. Thus, when coil 30 is fully energized it causes contacts 30a to open taking PTC resistor 16 and primary winding 22 out of the circuit and closes contacts 30b to short out secondary winding 24.

Figure 4:
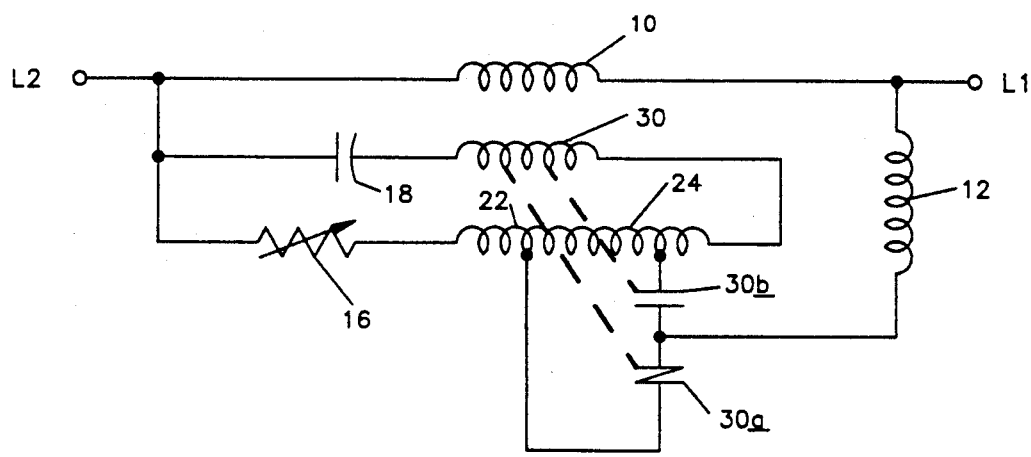

As seen in FIG. 4, normally open contacts 30b are coupled to a tap in the secondary winding so that only a portion of the secondary winding is shorted out when relay 30 closes contacts 30b.

Figure 5:
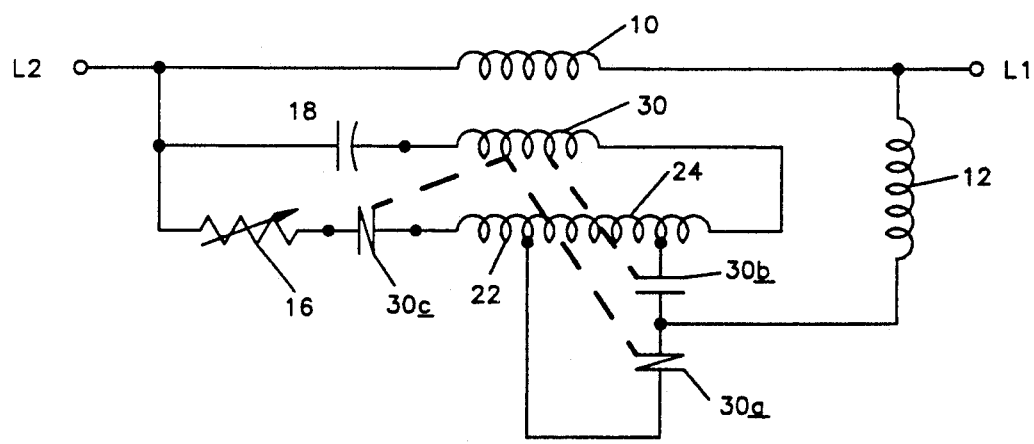

In FIG. 5 a third set of contacts, normally closed contacts 30c is placed between the PTC resistor 16 and the primary winding 22.

The relay is selected to pick up at some ideal full load run rating of the run capacitor circuit. As mentioned above, the PTC resistor functions as current and voltage gate to both the auxiliary winding circuit and the autotransformer thereby protecting both by its characteristic switching from low to high resistance.

It will be seen that the auxiliary winding is excited through a stepped-up capacitor and PTC resistor thereby developing similar or higher locked rotor torque to start the motor. As the motor accelerates the PTC resistor switches and the voltage/current in the primary of the autotransformer falls. The relay, if used, in series with the capacitor, picks up and removes the PTC resistor and primary winding cf the autotransformer from the circuit. When the relay is used the autotransformer is open circuited and the auxiliary winding is complete through the coil and capacitor only.

It will be noted that the relay normally remains in the circuit continuously but can drop out should the load increase sufficiently to decrease the current to the drop out point so that the motor can develop extra torque and prevent stalling due to heavier load conditions by full re-energization of the auxiliary winding.

Use of the autotransformer is advantageous due to lower cost, greater efficiency, better regulation, no isolation of windings, being smaller in size and having decreased exciting current. The PTC resistor protects the autotransformer windings from a sustained excessive line voltage. Further, since start capacitors tend to degrade in five or six years a longer life expectancy is achieved by not using a start capacitor while still obtaining the beneficial start characteristics of a capacitor start motor.

Although the invention has been described with use of a run capacitor in which capacitance is reflected, it is also within the purview of the invention to use an autotransformer without a run capacitor in order to reflect the inductive reactance back to the primary network thereby simulating capacitance via phase reversal.

In view of the above, it will be seen that the several objects of the invention are achieved and other advantageous results attained.

As various changes could be made in the above described invention without departing from the scope of the invention, it is intended that all matter contained in the above description as well as shown in the accompanying drawings shall be interpreted as illustrative and not in a limiting sense.

We claim:

1. An electric motor system having a main winding and an auxiliary winding and first and second power leads, the first power lead connected to one side of the main and auxiliary windings, the second power lead connected to another side of the main winding, comprising an autotransformer having a primary winding interconnected to a secondary winding, a parallel circuit having first and second branches connected across the main and auxiliary windings, the first branch comprising the primary winding serially connected to a PTC resistor, the second branch comprising the secondary winding of the autotransformer.

2. An electric motor system having a main winding and an auxiliary winding and first and second power leads, the first power lead connected to one side of the main and auxiliary windings, the second power lead connected to another side of the main winding, comprising an autotransformer having a primary winding interconnected to a secondary winding, a parallel circuit having first and second branches connected across the main and auxiliary winding, the first branch comprising the primary winding connected to time delay means for de-energizing the primary winding, the second branch comprising the secondary winding of the autotransformer.

3. An electric motor system according to claim 2 further including a capacitor serially connected to the secondary winding of the autotransformer.

4. An electric motor system according to claim 3 further including an NTC element coupled around the secondary winding.

5. An electric motor system according to claim 3 in which the time delay means comprises a PTC resistor.

6. An electric motor system according to claim 4 in which the time delay means comprises a PTC resistor.

7. An electric motor system according to claim 5 further including a relay coil serially connected to the capacitor, normally closed contacts connected to the PTC resistor and adapted to open when the coil is energized, whereby the PTC resistor and the primary winding will be de-energized when the coil is energized.

8. An electric motor system according to claim 3 further including a relay coil serially connected to the capacitor, normally open contacts in a line shunting the secondary winding and adapted to close when the coil is energized whereby the secondary winding current is shunted when the coil is energized.

9. An electric motor system having a main winding and an auxiliary winding and first and second power leads, the first power lead connected to one side of the main and auxiliary windings, the second power lead connected to another side of the main winding, comprising an autotransformer having a primary winding with first and second ends and a secondary winding with first and second ends, the first end of the primary winding connected to the second end of the secondary winding to form a common connection, the common connection coupled to the first power lead, a PTC element connected between the second end of the primary winding and the main winding, the first end of the secondary winding connected to a run capacitor which in turn is connected to the other side of the main winding.

10. An electric motor system according to claim 9 further including a relay having an electromagnetic coil and first normally open contacts and second normally closed contacts responsive to selected current level in the coil to move to the opposite state of energization, the coil connected to the run capacitor, the normally open contacts connected between the common connection and the second end of the secondary winding and the normally closed contacts connected between the PTC element and the auxiliary winding.

11. An electric motor system having a main winding and an auxiliary winding and first and second power leads, the first power lead connected to one side of the main and auxiliary windings, the second power lead connected to another side of the main winding, comprising an autotransformer having a primary winding interconnected with a secondary winding each having an outer end, the autotransformer having first and second taps, a PTC element connected between the outer end of the primary and the second power lead, a relay having an electromagnetic coil and a first set of normally open contacts and a second set of normally closed contacts responsive to selected current level in the coil to move to the opposite state of energization, a run capacitor serially connected to the coil, the run capacitor and the coil connected between the outer end of the secondary winding and the second power lead, a contact of the normally open contacts being connected to a contact of the normally closed contacts and to the auxiliary winding, another contact of the normally open contacts connected to one of the first and second taps and another contact of the normally closed contacts connected to the other of the first and second taps.

12. An electric motor system according to claim 11 in which the relay further includes a third set of normally closed contacts responsive to a selected current level in the coil, the third set of normally closed contacts connected between the PTC element and the outer end of the primary winding.

* * * * *